United States Patent Office 2,855,434
Patented Oct. 7, 1958

2,855,434
METHOD FOR PREPARING UNSATURATED AROMATIC COMPOUNDS

Frank Fekete, Buffalo, N. Y., assignor to Pittsburgh Plate Glass Company, Allegheny County, Pa., a corporation of Pennsylvania No Drawing. Application January 5, 1956
Serial No. 557,450

9 Claims. (Cl. 260—486)

This invention relates to a method for preparing novel polymerizable monomeric compounds, and pertains more particularly to the reaction of haloalkyl derivatives of alkyl aromatic compounds with the salts of alpha, beta-ethylenically unsaturated monocarboxylic acids in the presence of a quaternary ammonium compound catalyst.

Useful haloalkyl derivatives of alkyl benzenes can be prepared by reacting an alkyl benzene such as xylene, and particularly meta xylene, with an aldehyde such as formaldehyde, in the presence of hydrogen chloride or other hydrogen halide. It is thus possible to prepare compounds of the general molecular structure $$Ar(R_1-X)_n$$

wherein Ar is an alkyl substituted aromatic radical, $R_1$ is alkylene, X is halogen such as chlorine, bromine or iodine, and $n$ is a whole number from 1 to 3. The alkyl groups attached to the aryl radical are preferably methyl but may also be ethyl, propyl, butyl, or the like. Groups or radicals required to satisfy the carbons in the benzene ring and which are not alkyl or haloalkyl groups may be hydrogen, chlorine, bromine, or the like. One particularly useful example of such compounds is 4,6-bis(chloromethyl)m-xylene, which may also be termed dichlorodurene.

In a copending application, Serial No. 557,451, filed January 5, 1956, it is disclosed that the haloalkyl derivatives of alkyl aromatic compounds react with salts of alpha, beta-ethylenically unsaturated monocarboxylic acids in the presence of a solvent comprising either dimethyl formamide or dimethyl sulfoxide to give novel monomeric compounds, which in turn polymerize to form hard, clear homopolymers or polymerize with other monomers to form useful interpolymers. The homopolymers and interpolymers are useful as resinous components of coating compositions, or as casting compositions or molding compositions, and the like.

It has now been discovered that the need for dimethyl formamide or dimethyl sulfoxide as a solvent is eliminated if the reaction is carried out in the presence of a catalytic quantity of a quaternary ammonium compound. By this novel process the use of expensive solvents is eliminated, as is the problem of separating the product from said solvents.

The process of this invention may be illustrated as follows, wherein 4,6-di(chloromethyl)m-xylene and the sodium salt of methacrylic acid are utilized for illustrative purposes:

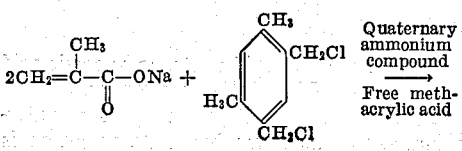

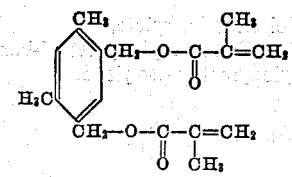

All of the compounds obtained by the process of this invention are believed to be novel and are the subject of copending application, Serial No. 557,431, filed January 5, 1956. These compounds possess the structure $$(R-R_1)_n-Ar$$

wherein R is a radical derived by removing the carboxyl hydrogen atom from an alpha, beta-ethylenically unsaturated monocarboxylic acid, $R_1$ is an alkylene radical, $n$ is a whole number from 1 to 3, and Ar is an aromatic radical, preferably one having at least one side chain substituent other than an $(R-R_1)$ group.

Examples of compounds which can be prepared by the process of this invention include the following. Because of the complexity of the compounds, two or more alternative systems of nomenclature are given.

(1) 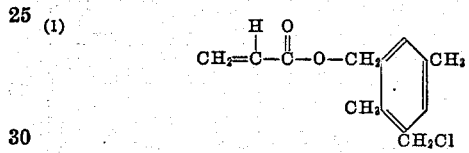

(a) 1,4-dimethyl-3-chloromethyl-5-acryloxymethyl-benzene.
(b) 3-chloromethyl-5-acryloxymethyl-p-xylene.

(2) 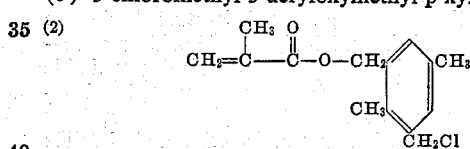

(a) 1,4-dimethyl-3-chloromethyl-5-methacryloxymethyl-benzene.
(b) 3-chloromethyl-5-methacryloxymethyl-p-xylene.

(3) 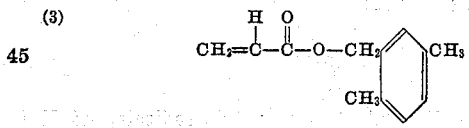

(a) dimethylbenzyl acrylate.
(b) 1,4-dimethyl-5-acryloxymethyl-benzene.
(c) 2-acryloxymethyl-p-xylene.

(4) 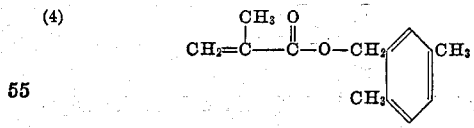

(a) dimethylbenzyl methacrylate.
(b) 1,4-dimethyl-5-methacryloxymethyl-benzene.
(c) 2-methacryloxymethyl-p-xylene.

(5) 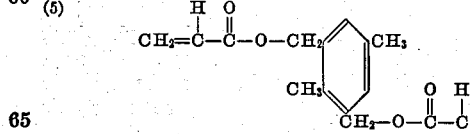

(a) α³,α⁵-durenediol-diacrylate.
(b) 1,4-dimethyl-3,5-diacryloxymethyl-benzene.

(c) 3,5-diacryloxymethyl-p-xylene.

(6) 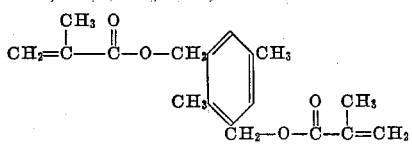

(a) α³,α⁵-durenediol-dimethacrylate.
(b) 1,4-dimethyl-3,5-dimethacryloxymethyl-benzene.
(c) 3,5-dimethacryloxymethyl-p-xylene.

(7) 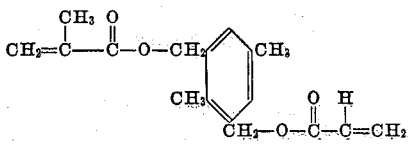

(a) 1,4-dimethyl - 3 - acryloxymethyl - 5 - methacryloxymethyl-benzene.
(b) 3-acryloxymethyl-5-methacryloxymethyl-p-xylene.

Any compound having the structure

Ar—(R₁—X)ₙ wherein Ar, R₁, X and $n$ have the significance given hereinabove may be utilized in the process of this invention. Preferably, however, Ar represents a phenyl group containing two or more alkyl substituents, R₁ represents a methylene (CH₂—) group, X is chlorine and $n$ is either 1 or 2. Compounds of this preferred class are prepared by the chloromethylation of xylene, such as o, m, or p-xylene, or mesitylene (1,3,5-trimethyl benzene). Obviously, the compounds obtained may be o-, m-, or p-substituted, or mixtures of o-, m-, and p-derivatives may be obtained. Compounds in which the radical R₁ represents alkylene groups other than methylene, for example, ethylene, propylene or butylene groups, are obtained when acetaldehyde, propionaldehyde, and butyraldehyde are substituted for formaldehyde in the halomethylation reaction.

The alpha, beta-ethylenically unsaturated monocarboxylic acid which in the form of an alkali metal salt such as the sodium or potassium salt is reacted with the haloalkyl compound, is preferably acrylic acid or methacrylic acid, both of which are economically available in commercial quantities. However, other alpha, beta-ethylenically unsaturated monocarboxylic acids, such as 2-butenoic acid, 2-methyl-propenoic acid, and the like may also be utilized with good results.

The quaternary ammonium compounds which are utilized as catalysts in the present process possess the following basic structure:

wherein R₁, R₂, R₃ and R₄ are organic radicals and X is an acid radical. The salts may be considered as reaction products of the quaternary ammonium hydroxide of the formula:

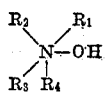

and an acid of the formula HX, where X is the negative radical of the acid.

In the formulae, the organic groups R₁, R₂, R₃ and R₄ may be of a single kind or they may be mixed. All of them may be hydrocarbon such as alkyl, alkenyl, or alkynyl, for example, ethyl, methyl, propyl, isopropyl, n-butyl, secondary butyl, tertiary butyl, butenyl, vinyl, methallyl, or they may be oleyl or stearyl. All or a part may be aryl, for example, phenyl or benzyl. In some instances the groups such as R₄ may be an organic acid residue, such as one of the formula:

where R is a hydrocarbon group containing from 1 to 18 carbon atoms, and may be alkyl, aralkyl or aryl, for example, lauryl, oleyl, phenyl, benzyl, or the like. In some instances it will be apparent that two of the groups R are joined or interconnected in a ring structure. This structure is represented by the pyridinium salts. Salts of the formula:

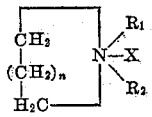

wherein $n$ is a whole number, for example 2 or 3, and R₁, R₂ and X are as above defined also belong in this class.

It is to be understood that a plurality of ammonium groups may share a common hydrocarbon radical. Such compounds are represented by ethylene bis(pyridinium chloride) and ethylene bis(trimethyl ammonium bromide).

Ethylene, propylene, butylene and higher alkylene or ethylenically unsaturated hydrocarbon groups may also be present in one or more of the positions R₁, R₂, R₃ or R₄ as may be substituents such as chlorine or bromine atoms or hydroxyl groups.

In the acid component of the salt, the negative radical is represented by the group X. Organic acids employed preferably are of a molecular weight below about 100. Salts of weak acids, of course, are of a basic character owing to the strong basicity of the quaternary ammonium hydroxide from which these salts are derived. Salts of the strong non-oxidizing mineral acids such as hydrochloric acid usually are most satisfactory.

Specific examples of quaternary ammonium salts which may be utilized as catalysts in the process of the present invention include the following:

(1) Trimethyl benzyl ammonium acetate.
(2) Trimethyl benzyl ammonium chloride.
(3) Trimethyl benzyl ammonium bromide.
(4) Triethyl benzyl ammonium chloride.
(5) Tripropyl benzyl ammonium chloride.
(6) Tributyl benzyl ammonium chloride.
(7) Cetyl trimethyl ammonium chloride.
(8) Octadecyl trimethyl ammonium chloride.
(9) Trimethyl benzyl ammonium sulfate.
(10) Lauroyl pyridinium chloride.
(11) Phenyl trimethyl ammonium chloride.
(12) Tolyl trimethyl ammonium chloride.
(13) Benzyl trimethyl ammonium phosphate.
(14) Benzyl trimethyl ammonium iodide.
(15) Ethyl pyridinium chloride.
(16) Phenyl trimethyl ammonium chloride.
(17) Octyl trimethyl ammonium bromide.
(18) Ethylene bis(pyridinium chloride).
(19) Ethylene bis(trimethyl ammonium bromide).
(20) Trimethyl benzyl ammonium oxalate.
(21) Trimethyl benzyl ammonium maleate.
(22) Trimethyl benzyl ammonium tartrate.
(23) Trimethyl benzyl ammonium lactate.
(24) Tetramethyl ammonium chloride.

One important group of quaternary salt catalysts comprises those with a benzyl group and three alkyl groups, (methyl, ethyl, propyl, butyl, amyl or the like) directly attached to ammonium nitrogen. These compounds may be represented by the formula:

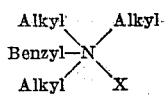

X being an acid radical of an acid as strong as acetic acid (dissociation constant $1.75 \times 10^{-5}$) or stronger.

Another important class of catalysts comprises quaternary ammonium salts where one hydrocarbon group is higher alkyl and contains at least 8 and up to 18 carbon atoms, and three hydrocarbon groups are lower alkyl radicals containing up to 6 carbon atoms (methyl, ethyl, propyl, butyl, amyl or hexyl). The structure of such compounds may be represented by the formula:

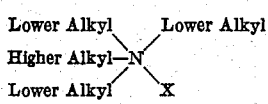

X again being an acid or negative group of an acid at least as strong as acetic acid.

The quantity of the quaternary ammonium salt utilized may be varied widely, but in general it is employed in an amount of about 0.1 percent to 3.0 percent by weight of the two reactants. Stated another way, the catalyst is utilized in an amount of about 1.0 gram per mole of reactants. Larger or smaller amounts may be utilized if desired.

In order to provide a convenient medium for carrying out the reaction, some free alpha, beta-ethylenically unsaturated monocarboxylic acid is employed. Thus if a salt of methacrylic acid is utilized as one of the reactants, free methacrylic acid would be utilized in the reaction mixture, and if a salt of acrylic acid is one of the reactants, free acrylic acid would be employed as the reaction medium. The quantity of the alpha, beta-ethylenically unsaturated monocarboxylic acid should be approximately twice as great as the amount of the acid salt employed as the reactant in the process, although this amount is not critical and can be varied substantially; for example, it is possible to carry out the reaction quite readily utilizing equal amounts of free acid and salt.

The reaction of this invention may be carried out in several different ways. One preferred method involves first heating the free alpha, beta-ethylenically unsaturated monocarboxylic acid, containing a polymerization inhibitor such as hydroquinone, 4,4'-dihydroxy-3,3'-dimethyldiphenyl, or the like, to reflux, ordinarily about 140° C. to 150° C. The inhibitor is added to prevent polymerization of the free acid and/or the acid salt. The acid salt is then added incrementally to the refluxing mixture until all has entered solution after which the alkyl aromatic compound is added together with the quaternary ammonium compound. Coupling of the acid salt and the aromatic compound takes place rapidly and is substantially complete in approximately 10 to 15 minutes.

The reaction mixture is then allowed to cool and the potassium chloride which has precipitated is removed by filtering. The acid-product layer is distilled to remove free acid and to give the desired product.

Alternatively, the reaction can be carried out simply by admixing the reactants, catalyst, free acid and inhibitor and heating the resulting mixture to reflux for about 10 to 30 minutes, after which the alkali metal salt is removed by filtering and the reaction mixture distilled to give the desired product.

The quantity of reactants utilized in carrying out the reaction depends, of course, on the number of haloalkyl groups of the aromatic compounds which are to be replaced. For example, if it is desired to couple only one alpha, beta-ethylenically unsaturated monocarboxylic acid residue to the alkyl aromatic compound, then the reaction is carried out utilizing equal molecular quantities of the reactants, or by utilizing a slight excess of the acid salt. If it is desired to replace two haloalkyl groups, two moles of the acid salt, or a slight excess, are employed. Although there is no economic advantage in doing so, larger or smaller amounts of either reactant may be utilized.

The following examples illustrate in detail the novel process of this invention. The examples are not intended to limit the invention, however, for there are, of course, numerous possible variations and modifications in the procedures herein described.

*Example I*

Dimethylbenzyl methacrylate was prepared utilizing the following materials in the amounts set forth:

Monochloromethyl xylene___ 772.3 grams (5 moles).
Potassium methacrylate____ 633.0 grams (5.1 moles).
Methacrylic acid_____ 1260 grams.
Hydroquinone _____ 15 grams.
Trimethyl benzyl ammonium chloride _____ 5 grams.

The methacrylic acid and hydroquinone were heated to reflux (140° C.–150° C.). The potassium methacrylate was then added in incremental quantities until it was all in solution. Then the monochloromethyl xylene and trimethyl benzyl ammonium chloride were added and coupling of the acid and the monochloromethyl xylene was complete in about 15 minutes as indicated by deposition of potassium chloride. The reaction mixture was then allowed to cool and the potassium chloride removed, washed and weighed to give 372 grams (theoretical amount 372.8 grams).

The acid-product layer was then distilled to remove the methacrylic acid. One thousand grams of dimethylbenzyl methacrylate (98 percent) was obtained. The product distilled at 105° C.–111° C./1.3 mm.; $n_D^{23}=1.5118$.

*Example II*

Example I was repeated substituting 5.1 moles of potassium acrylate for the potassium methacrylate. An almost quantitative yield of dimethylbenzyl acrylate was obtained.

*Example III*

Five moles of 4,6-di(chloromethyl)-m-xylene was reacted with 10.1 moles of potassium methacrylate by admixing the two reactants with 2000 grams of methacrylic acid, 30 grams of hydroquinone and 10 grams of trimethyl benzyl ammonium chloride. The reaction mixture was heated to reflux for about 20 minutes, cooled, the potassium methacrylate removed by filtering and the remaining reaction mixture distilled at reduced pressure to give an excellent yield of $\alpha^3$, $\alpha^5$-durenediol dimethacrylate.

*Examples IV to VI*

Example I was repeated substituting each of the following for the trimethyl benzyl ammonium chloride: (1) lauryl pyridinium chloride, (2) trimethyl benzyl ammonium lactate, and (3) triethyl benzyl ammonium chloride. In each instance a substantial yield of dimethylbenzyl methacrylate was obtained.

When the examples are repeated substituting other alkali metal salts of alpha, beta-ethylenically unsaturated monocarboxylic acids for the potassium salts, or utilizing other of the reactants described hereinabove, compounds of the structure

are again obtained in excellent yield. Similarly, other quaternary ammonium compounds, and other polymerization inhibitors may be employed in the process of this invention.

Although specific examples of the invention have been set forth hereinabove, it is not intended to limit the invention solely thereto, but to include all of the variations and modifications which are within the scope of the appended claims.

I claim:

1. A method of preparing a compound of the structure

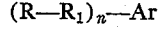

wherein R is the radical derived by removing the carboxyl hydrogen atom from a lower-2-alkenoic acid, $R_1$ is a lower alkylene radical, Ar is a lower alkyl substituted benzene radical, and n is a whole number from 1 to 3, which comprises reacting an alkali metal salt of said lower-2-alkenoic acid with a compound of the structure $$Ar—(R_1—X)_n$$

wherein X is a halogen atom selected from the class consisting of chlorine, bromine, and iodine, and $R_1$, Ar and $n$ have the significance set forth hereinabove, in the presence of the free lower-2-alkenoic acid, a polymerization inhibitor, and a quaternary ammonium salt of a non-oxidizing acid at least as strong as acetic acid, and having 4 groups directly attached to the ammonium nitrogen atom, 3 of the groups being hydrocarbon radicals containing from 1 to 6 carbon atoms, and the fourth group being a hydrocarbon radical containing from 8 to 18 carbon atoms.

2. The method of claim 1 wherein the reaction is carried out by adding the acid salt, the alkyl benzene compound and the catalyst to a refluxing mixture of the free acid and a polymerization inhibitor, continuing the heating for about 15 to 30 minutes, removing the precipitated alkali metal salt, and distilling the remainder of the reaction mixture.

3. A method of preparing dimethylbenzyl methacrylate which comprises reacting sodium methacrylate with monochloromethyl xylene in approximately equimolar quantities and in the presence of a polymerization inhibitor, methacrylic acid and a quaternary ammonium salt of a non-oxidizing acid at least as strong as acetic acid, and having 4 groups directly attached to the ammonium nitrogen atom, 3 of the groups being hydrocarbon radicals containing from 1 to 6 carbon atoms, and the fourth group being a hydrocarbon radical containing from 8 to 18 carbon atoms.

4. A method of preparing $\alpha^3$, $\alpha^5$-durenediol dimethacrylate which comprises reacting 4,6-di(chloromethyl)-m-xylene with potassium methacrylate in an amount such that there is present about 2 moles of potassium methacrylate for each mole of said 4,6-di(chloromethyl)-m-xylene, in the presence of methacrylic acid, a polymerization inhibitor, and a quaternary ammonium salt of a non-oxidizing acid at least as strong as acetic acid, and having 4 groups directly attached to the ammonium nitrogen atom, 3 of the groups being hydrocarbon radicals containing from 1 to 6 carbon atoms, and the fourth group being a hydrocarbon radical containing from 8 to 18 carbon atoms.

5. A method of preparing dimethylbenzyl acrylate which comprises reacting monochloromethyl xylene with potassium acrylate in approximately equimolar quantities, and in the presence of acrylic acid, a polymerization inhibitor, and a quaternary ammonium salt of a non-oxidizing acid at least as strong as acetic acid, and having 4 groups directly attached to the ammonium nitrogen atom, 3 of the groups being hydrocarbon radicals containing from 1 to 6 carbon atoms, and the fourth group being a hydrocarbon radical containing from 8 to 18 carbon atoms.

6. A method of preparing a compound of the structure $$(R—R_1)_n—Ar$$

wherein R is the radical derived by removing the carboxyl hydrogen atom from a compound of the class consisting of acrylic acid and methacrylic acid, $R_1$ is a lower alkylene radical, Ar is a lower alkyl substituted benzene radical, and $n$ is a whole number from 1 to 3, which comprises adding an alkali metal salt of said acid, a compound of the structure $$Ar—(R_1—X)_n$$

wherein X is a halogen atom selected from the class consisting of chlorine, bromine, and iodine, and $R_1$, Ar and $n$ have the significance set forth hereinabove, and trimethylbenzyl ammonium chloride to a refluxing mixture of said acid and a polymerization inhibitor, continuing the heating for about 15 minutes to 30 minutes, removing the precipitated alkali salt which forms, and distilling the remainder of the reaction mixture.

7. A method of preparing dimethylbenzyl methacrylate which comprises reacting sodium methacrylate with monochloromethyl xylene in approximately equimolar quantities and in the presence of a polymerization inhibitor, methacrylic acid and trimethylbenzyl ammonium chloride.

8. A method of preparing alpha³, alpha⁵-durenediol dimethacrylate which comprises reacting 4,6-di(chloromethyl)m-xylene with potassium methacrylate in an amount such that there is present about 2 moles of potassium methacrylate for each mole of said 4,6-di-(chloromethyl)-m-xylene, in the presence of methacrylic acid, a polymerization inhibitor and trimethylbenzyl ammonium chloride.

9. A method of preparing dimethylbenzyl acrylate which comprises reacting monochloromethyl xylene with potassium acrylate in approximately equimolar quantities, and in the presence of acrylic acid, a polymerization inhibitor, and trimethylbenzyl ammonium chloride.

References Cited in the file of this patent

UNITED STATES PATENTS

| | | |
|---|---|---|
| 2,129,667 | Barrett et al. | Sept. 13, 1938 |
| 2,367,484 | Clifford | Jan. 16, 1945 |
| 2,594,184 | Ladd | Apr. 22, 1952 |

OTHER REFERENCES

Blont et al.: "Monomers" (Interscience Publishers, Inc., New York, 1951), vol. 1, "Esters of Methacrylic Acid," pp. 4, 15–16 and 48.

Yamashita et al.: Chem. Abst., 48 (1954), p. 1725 (de).

Yamashita et al., Chem. Abst., 48 (1954), p. 9100 (hi).